May 7, 1957 C. R. WILLIAMS 2,791,725

DIODE PULSE AMPLIFIER

Filed April 28, 1951 4 Sheets-Sheet 1

INVENTOR:
Charles R. Williams
By Herbert E. Metcalf
HIS PATENT ATTORNEY

Fig. 6
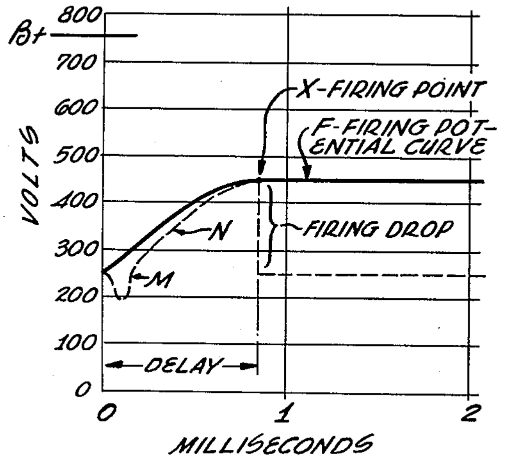
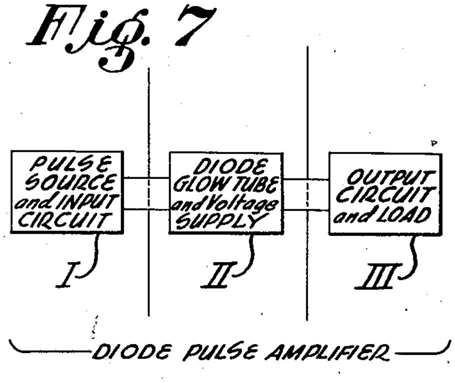
Fig. 8a
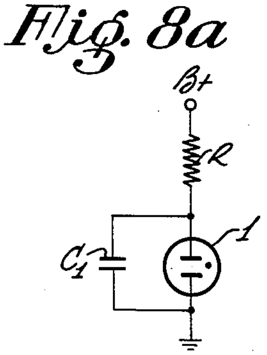
Fig. 8b
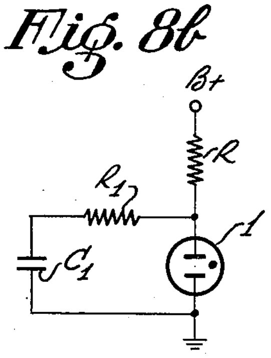
Fig. 8c
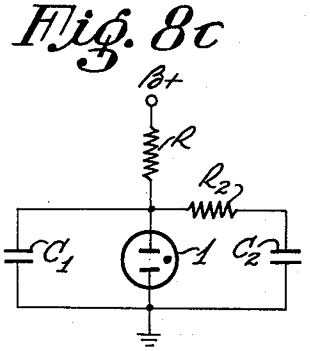
Fig. 9a
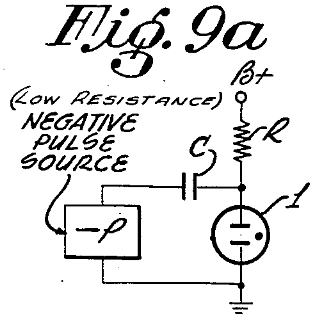
Fig. 9b
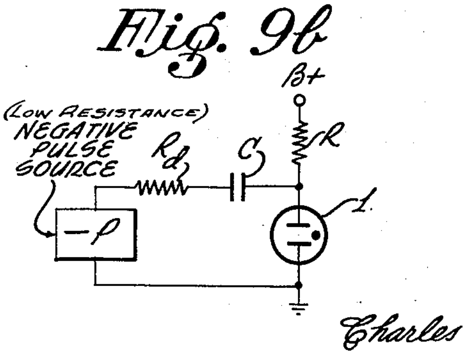
INVENTOR:
Charles R. Williams
By Herbert E. Metcalf
HIS PATENT ATTORNEY INVENTOR:
Charles R. Williams
By Herbert E. Metcalf
HIS PATENT ATTORNEY May 7, 1957 C. R. WILLIAMS 2,791,725

DIODE PULSE AMPLIFIER

Filed April 28, 1951 4 Sheets-Sheet 4

INVENTOR:
Charles R. Williams
By Herbert E. Metcalf
HIS PATENT ATTORNEY

United States Patent Office 2,791,725

Patented May 7, 1957

2,791,725

DIODE PULSE AMPLIFIER

Charles R. Williams, Hawthorne, Calif., assignor to Northrop Aircraft, Inc., Hawthorne, Calif., a corporation of California Application April 28, 1951, Serial No. 223,565

6 Claims. (Cl. 315—166)

The present invention relates generally to pulse amplifiers and more particularly to a new and novel diode glow tube for amplifying pulses.

Gas-filled glow discharge tubes have the property of maintaining a relatively constant burning potential for a wide range of tube current and having a substantially higher firing than burning potential. The drop in tube potential upon firing is very rapid and steep, and thereby can permit the discharge of a high current surge from a connected capacitance to an output load. Thus, the firing to burning voltage differential can be made to provide a large pulse source by employing suitable connected capacitance.

It is an object of this invention to provide a simple and effective gas-filled diode pulse amplifier.

Briefly, the foregoing object and other objects ancillary thereto are preferably accomplished by providing a subminiature diode glow tube containing two cold electrodes of ordinary wire and filled with an inert gas such as neon, for example, at glow discharge pressure. The tube is normally maintained conducting by a high electrode voltage supplied through a current limiting resistance. Input pulses, which are to be amplified in the output, are applied to the diode such that each causes momentary quenching of the glow discharge. Subsequent refiring of the diode forced by the high supply voltage causes an output pulse to be emitted after each input pulse. Following quenching of the glow discharge, energy storage occurs in capacitance in the output circuit, and the output pulse is derived from the sharp drop in tube potential upon refiring. The output pulse amplitude is directly a function of the diode characteristic, that is, the difference between its firing and burning potentials, and is independent of the amplitude of the input pulse provided that the input pulse has sufficient amplitude for quenching. The time delay between the input pulse and the output pulse, and the energy delivered by the output pulse are both directly a function of the storage capacitance associated with the output circuit. The tube can be made more sensitive to the input quenching pulses by the use of a small percentage of a polyatomic quenching gas or vapor mixed with the inert gas.

The invention possesses other objects and features, some of which, together with the foregoing, will be set forth in the following description of a preferred embodiment of the invention, and the invention will be more fully understood by reference to the accompanying drawings in which:

Figure 6 is a graph of the triggering response of the diode glow tube for the circuit of Figure 5.

Figure 7 shows a block diagram of the diode pulse amplifier.

Figure 8*a* is a drawing illustrating a circuit in which the diode glow tube is connected as an oscillator.

Figure 8*b* is a drawing showing a circuit wherein the oscillator of Figure 8*a* can be resistively damped to prevent oscillation.

Figure 8*c* is a drawing of another damping circuit wherein oscillation can be prevented in the oscillator of Figure 8*a*.

Figures 9*a*, 9*b*, 9*c*, 9*d* and 9*e* show various input circuits with negative pulse source and which are illustrated undamped and damped in different ways.

Figure 10A:
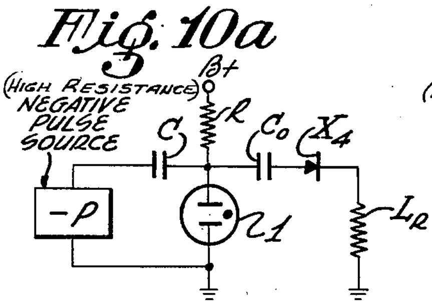
Figure 10B:
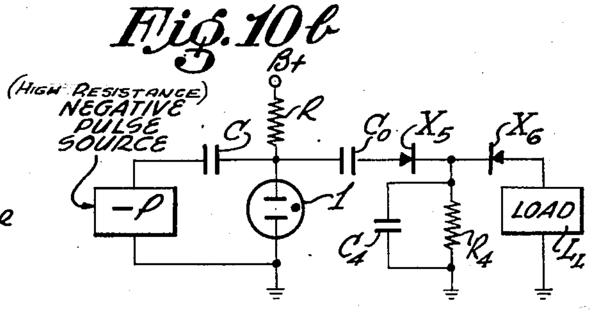
Figure 10C:
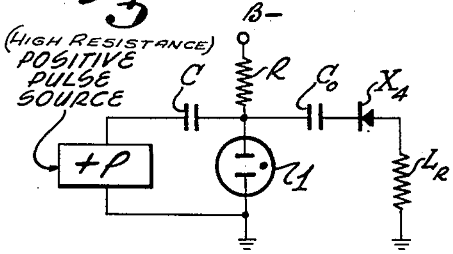

Figures 10*a*, 10*b* and 10*c* are drawings of preferred circuits for use with a resistive load in a negative pulse amplifier, with a reactive load in a negative pulse amplifier, and for the cathode triggering of a positive pulse amplifier with a resistive load, respectively.

Figures 11*a*, 11*b*, 11*c*, 11*d* and 11*e* are various pulse inverter circuits for different circuit conditions.

Figure 12:
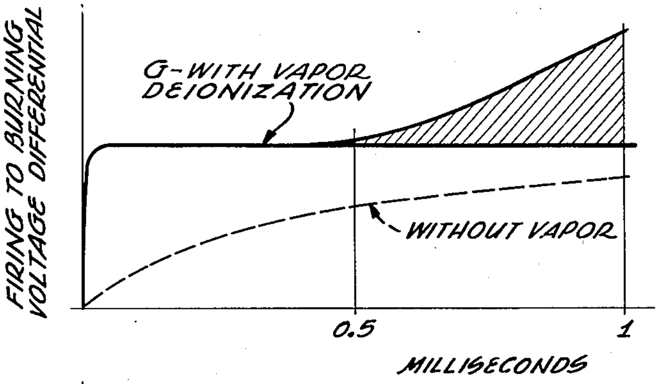

Figure 12 is a graph showing the effect of a deionizing vapor included in a diode glow tube on the deionization characteristics.

Figure 13:
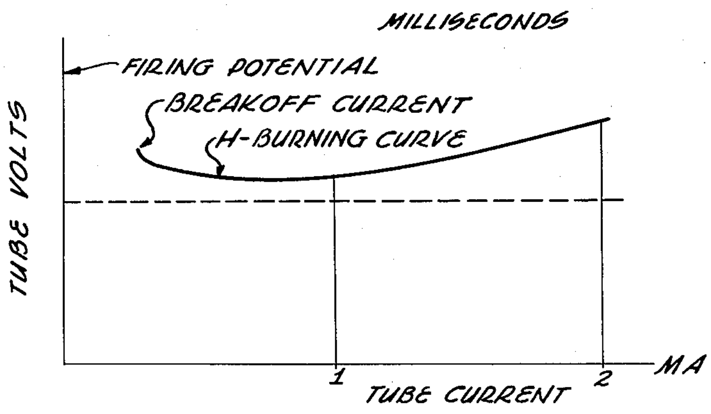

Figure 13 is a graph of the electrical characteristics of a diode glow tube including a small amount of deionizing vapor.

Figure 1:
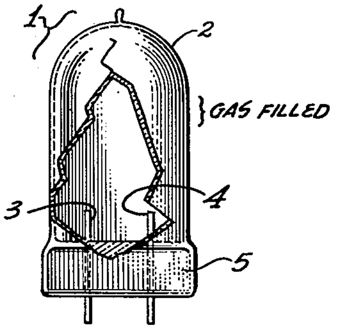
Figure 1 is a drawing showing a view of a preferred embodiment and construction of the diode glow tube.

Referring to Figure 1 the diode glow tube 1 consists of a small glass envelope 2 containing two cold electrodes 3 and 4, and is filled with an inert gas to a pressure sufficient to produce satisfactory glow discharge characteristics.

The envelope 2 can be made, for example, from suitable Kovar-sealing glass tubing and the electrodes 3 and 4 of short parallel lengths of Kovar wire, hydrogen annealed for obtaining a leak-proof seal, which are supported by a press seal 5 of the glass tubing through which the electrodes extend and external leads can be connected. The envelope 2 can be made just large enough to contain the two electrodes 3 and 4 although larger envelopes will somewhat increase the operational life of the tube. The diameter, length and end shape of the electrodes are not critical, and electrode spacing is chosen to give the desired electrical characteristics. Either of the two electrodes can be used as the anode and the other as the cathode.

A preferred tube is approximately 0.25 inch in diameter, 1 inch long and each electrode can be made of Kovar wire 0.015 inch in diameter, 0.1 inch in electrode length, and spaced 0.10 inch apart. An inert gas such as neon, for example, can be used to fill the tube to 200 mm. Hg of pressure to obtain a desired firing to burning voltage differential.

Figure 2:
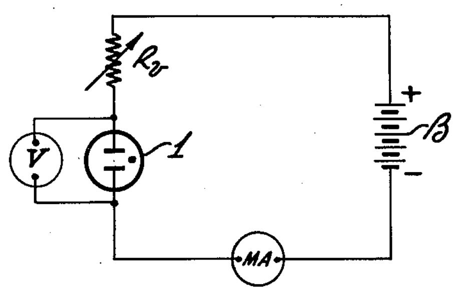
Figure 2 is a drawing showing a circuit used whereby the voltage-current characteristics for the diode can be obtained.
Figure 3:
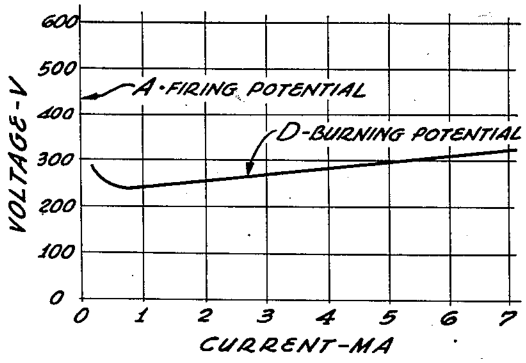
Figure 3 is a graph of the electrical characteristics of the diode glow tube filled with an inert gas at glow discharge pressure.

In a diode glow tube filled with an inert gas as before described, for example, the voltage-current characteristics of an electrical discharge between electrodes can be obtained with the circuit of Figure 2. The diode 1, there shown, is placed in series with a variable resistance $R_V$ and a milliammeter MA. A voltmeter V is connected across the electrodes of the diode 1 and the entire combination is connected to a sufficiently high D. C. voltage supply B which would insure initial ignition of the tube. By varying the resistance of $R_V$, typical characteristics of the diode glow tube are obtained, as shown in Figure 3; consist of a firing potential A and a burning potential versus current curve D. For glow discharge currents above 1 ma. the burning potential rises gradually with the increase of current. In the range from 0.1 ma. to 1 ma., the voltage-current curve D is nearly flat although a negative slope is displayed at the low current end of the curve. The glow is generally unstable for currents below about 0.1 ma.

Figure 4:
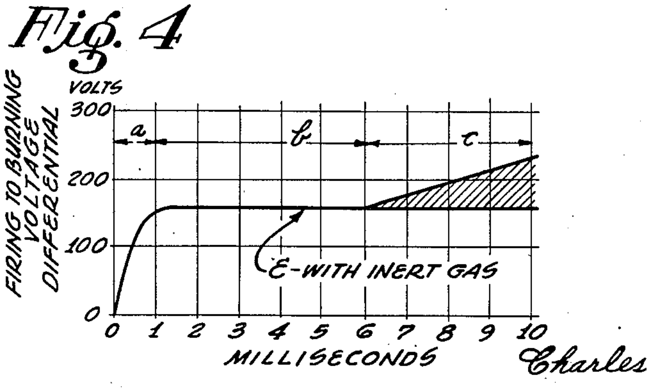
Figure 4 is a graph of the deionization characteristics of the diode glow tube filled with an inert gas at glow discharge pressure.

The potential of firing, point A, will depend upon the degree of initial ionization present in the gas. Figure 4 illustrates graphically the deionization characteristics, curve E, of the diode glow tube 1. The firing to burning voltage differential (A—D), which is the voltage difference between the firing potential A and the burning voltage D, is plotted as a function of deionization time, that is, the time between quenching of glow discharge and refiring. If the time delay is short, as in range *a*, Figure 4, then the residual ionization remaining is high and the firing potential is correspondingly lower. However, if the deionization time is long, as in range *c*, then the existing low residual ionization permits the firing potential to be erratic in a wide range above the more stable, short deionization time firing potential. There is, however, an intermediate optimum range *b* where the firing potential is stable and independent of deionization time.

Figure 5:
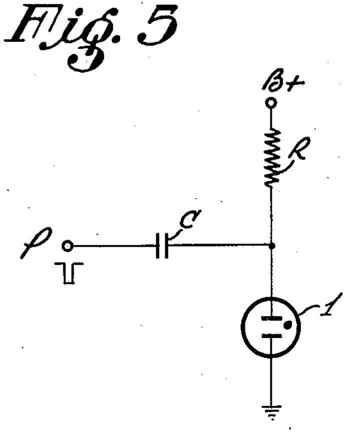
Figure 5 is a drawing showing a circuit in which the diode glow tube can be quenched and controlled by suitable input pulses.

If the ionization level is low, then the firing potential can easily be affected by cosmic rays, photo-electric emission, static charges on the envelope and other factors which tend to produce undesired fluctuations of firing potential. In the present method a stable firing potential is obtained by the employment of residual ionization remaining momentarily after a state of conduction; that is, the tube is normally conducting and the glow discharge is quenched only for sufficient time within the optimum range *b* to allow energy storage for an output pulse. Operation in the optimum range *b* results in output pulses of consistent amplitude regardless of input pulse amplitude or duration. The quenching is performed by applying a suitable quenching pulse from a pulse source P providing pulses tending to decrease the conducting tube potential, and can be applied via an input capacitor C as shown in the circuit of Figure 5. B+ voltage, there shown, is supplied through a current limiting resistance R to the diode glow tube 1 so that the diode 1 is normally conducting.

Thus, a negative input pulse applied to the diode 1 through the input capacitor C (see Figure 5) can extinguish the tube current momentarily. Figure 6 shows plotted a firing potential curve F for time after triggering. Also shown therein is the response of tube potential to a quenching input pulse. The broken curve in Figure 6 indicates the tube response to the quenching. There is a drop M in tube potential in response to the input pulse reducing tube potential thereby causing extinction of glow discharge current. The anode would, therefore, rise in potential toward the B+ supply and refiring will later occur at a point X on the firing potential curve which depends upon the width of the input pulse and the rate of R-C rise N of potential across the now non-conducting tube. A sharp drop in tube potential to the burning potential takes place on firing at the point X. A minimum deionizing time delay must be allowed either by sufficient input pulse width or R-C time constant, slowing the rate of tube potential rise in order to enable the firing potential to reach the optimum range plateau for firing corresponding with range *b* in Figure 4. The drop in tube potential upon firing is very rapid and can permit the stored energy discharge of a high current surge from a parallel connected capacitance to an output load. The time interval from quenching to subsequent refiring can be used as a pulse delay.

The diode pulse amplifier is illustrated in block diagram form in Figure 7 and consists of a pulse source and input circuit section I, the diode glow tube and voltage supply section II, and an output circuit and load section III. Section I includes a pulse source which provides through suitable impedance in the input circuit, the trigger pulses for quenching the subminiature gas discharge diode which is held normally conducting by a high voltage supply applied to the anode through a tube current limiting resistor in section II. The output circuit impedance of section III includes the output capacitor for energy storage following quenching to provide a high current pulse to an output load.

It can be noted from the electrical characteristics illustrated for the subminiature diode glow tube before described, at the low current end of the burning voltage characteristic of Figure 3, for example, the negative slope of the curve at this section indicates that the tube 1 will oscillate in this current range if a parallel capacitor $C_1$ is connected across it as shown in Figure 8*a*. The diode 1 is supplied with B+ voltage through a current limiting resistance R. The oscillation can be of a low amplitude as the current shifts between two points on the negative slope of the conductor curve, or it can be of high amplitude if the circuit time constants are long enough to permit quenching and subsequent refiring. Oscillation can be prevented by adding a damping resistor $R_1$ in series with the capacitor $C_1$ as shown in Figure 8*b*, or by adding a damping resistor $R_2$ and series capacitor $C_2$ connected across the diode 1 as in Figure 8*c*.

Figure 9C:
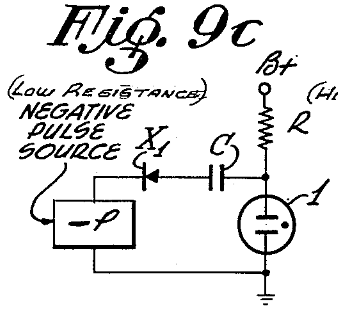

Figure 9*a* illustrates a diode glow tube 1, B+ power supply circuit including the limiting resistor R and an undamped input circuit wherein a negative pulse source —P is connected to the input capacitor C. If the pulse source of the input circuit section is of low resistance, it can cause oscillation when coupled to the tube 1 as shown. The addition of a series damping resistor $R_d$ as in Figure 9*b* can provide damping and prevent oscillation, but will also attenuate the input pulse. To obtain damping without input pulse attenuation, a crystal diode $X_1$ can be inserted in series with the input capacitor C as shown in Figure 9*c*, oriented to pass the negative input pulse and allow full utilization of the input capacitor C in obtaining sufficient R-C deionization time, yet will block when the tube 1 refires. Any small oscillation of the tube potential immediately sets up a self bias across the crystal $X_1$ placing it in a resistive state where it effectively damps further oscillation. The crystal diode $X_1$ so used also tends to block the coupling of output pulses back into the pulse source.

Figure 9D:
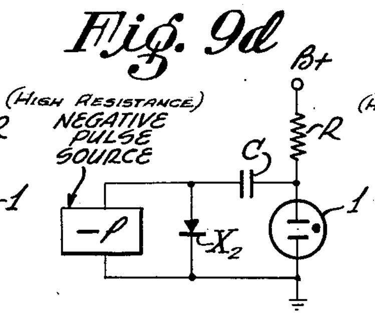
Figure 9E:
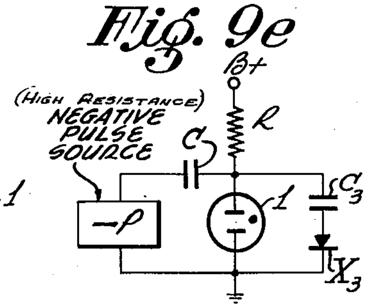

If the pulse source is of exceptionally high resistance, then it will not permit the input capacitance C to act effectively in obtaining time delay. In this case, a parallel crystal diode $X_2$ can be connected across the pulse source as shown in Figure 9*d*, or a series crystal diode $X_3$ and capacitor $C_3$ combination can be connected across the tube 1, is in Figure 9*e*, to obtain the desired operation. Crystals which are therein shown so placed offer high resistance to input pulses, hence do no seriously attenuate them but provide a low resistance path for time delay charging of the capacitors C and $C_3$.

High sensitivity to triggering can be obtained with crystal diode damping. The tube is placed on the verge of oscillation by suitable capacitance loading, then a very small input pulse will nudge it into a quench oscillation. When the anode reaches the firing potential following extinction, the tube will refire and the voltage consequently developed across the crystal diode exponentially decays to zero providing momentarily sufficient damping action to prevent continued oscillation.

The same capacitors which furnish R-C time delay also can provide output pulse energy upon refiring. The available pulse energy is divided among the input circuit, the B+ supply circuit, the dynamic resistance of the tube and the output circuit. The input circuit impedance can usually be made sufficiently high that it and the necessarily high supply current limiting resistor R subtract but little from the pulse energy. In order for the load to receive a majority of the available energy, the output coupling capacitor must form a majority of the R-C time delay, and the load resistance must be greater than the dynamic resistance of the tube.

For high sensitivity to triggering from a high impedance input, it is necessary that a relatively low impedance output load does not shunt out and thus greatly attenuate the input pulse. This can be accomplished by the insertion into the output circuit of a non-linear device such as a germanium crystal diode which offers a high resistance to the low amplitude triggering pulse, but as the back voltage is increased such as by the higher potential refiring pulses, the dynamic resistance approaches zero and permits a high current pulse to pass. The crystal $X_4$ in Figure 10*a*, so placed before the output load $L_R$, does not interfere with the charging of output capacitor $C_0$, and it also, in combination with the relatively low load resistance of $L_R$, provides effective oscillation damping for the circuit.

The diode pulse amplifier is equally sensitive to triggering by pulses generated in the output load as it is to pulses in the input circuit. Precaution hence must be taken to prevent passage back to the amplifier of pulses generated by inductive load kickback or by the firing of some gas tube in the load. Any type of rectifying device may be used for this purpose. The circuit of Figure 10*b* has two crystal diodes, $X_5$ performing the same function as crystal diode X, in the circuit of Figure 10*a* and $X_6$ for blocking negative pulses generated by load $L_L$. Reflected negative pulses are dissipated by shunt resistor $R_4$ and may be further attenuated by a parallel capacitor $C_4$.

All the above circuits have indicated triggering by negative pulses applied to the anode electrode. The tube is equally responsive to positive pulses applied to the cathode. For example, to convert the circuit of Figure 10*a* to cathode triggering, it is only necessary to change B+ to B−, and reverse the crystal diode $X_4$; then positive output pulses will be obtained from positive input pulses in the circuit of Figure 10*c*.

Figure 11A:
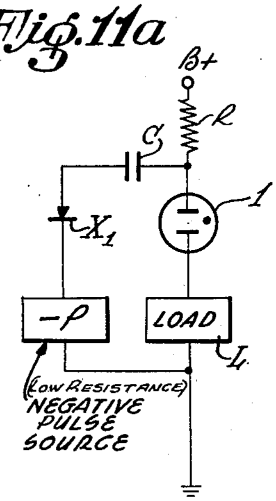
Figure 11B:
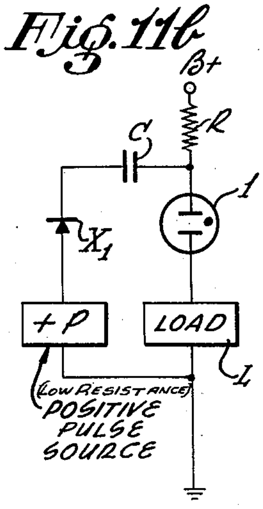
Figure 11C:
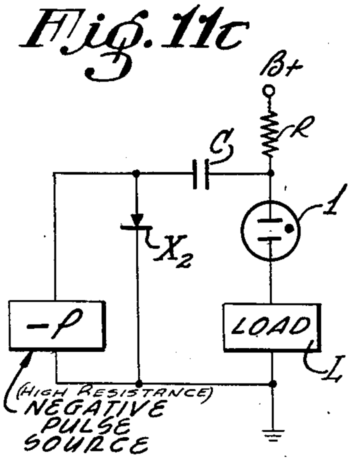
Figure 11D:
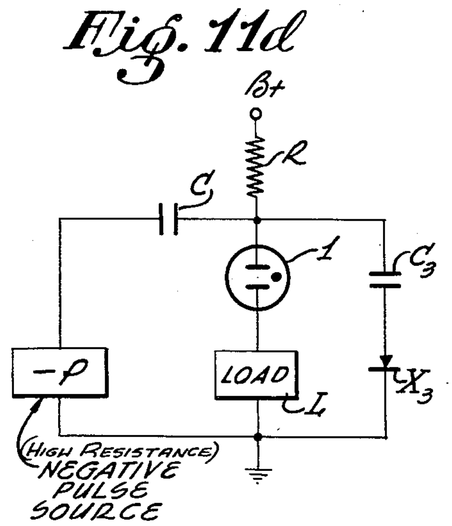
Figure 11E:
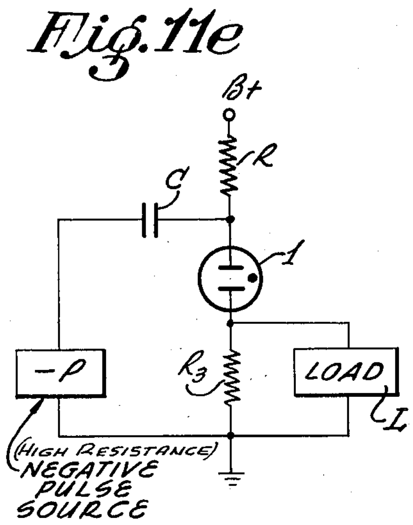

In addition to pulse amplification, the diode gas tube may also be used for pulse inversion. Figure 11*a* shows a circuit for converting negative input pulses to positive output pulses and Figure 11*b* a circuit for converting positive input pulses to negative output pulses. It is noted the input and output connections are on opposite sides of the tube 1 and the output to the load L is essentially in series with the input. Circuit simplicity is obtained in that the input capacitor C can also serve as the energy storage and output capacitor. Crystal diode $X_1$ damping is indicated, the crystal diode $X_1$ being reversed with a positive pulse source +P in Figure 11*b*. The circuits of Figures 11*a* and 11*b* are for use with low impedance inputs. A high impedance input should utilize the circuits of Figure 11*c* wherein the input is shunted by a crystal diode $X_2$, and Figure 11*d* wherein the series combination of a crystal diode $X_3$ and capacitor $C_3$ is connected across the tube 1 and load L. The circuits of Figures 11*a*, 11*b*, 11*c* and 11*d* indicate a low impedance load. If the load L has a high impedance, it can be shunted by a resistor, such as $R_3$ in Figure 11*e*.

A tube having the deionization characteristics of Figure 4 can operate at a maximum pulse rate of about 1000 pulses per second. The speed of operation is limited by the deionization time necessary to reach a consistent firing potential. If high energy output pulses are desired, then the speed may be further restricted by the time necessary to charge a large output capacitor. Increasing the steady state tube current to obtain higher charging rates is limited by the insensitivity of the tube to triggering at high currents.

The characteristics shown in Figure 3 and 4 are considerably altered by the presence of a small percentage of polyatomic gas or vapor impurity mixed with the inert gas. In general, the impurity will raise the stable firing and burning potentials, and may extend the depth of the erratic firing potential range to several hundred volts. As indicated by Figure 12, curve G, the deionization time required to reach the stable firing potential plateau is almost negligible in contrast to that without vapor (broken curve). In practical applications, the minimum time delay between triggering and refiring is limited by the relatively long time constants of even the smallest input and output capacitors that can be used.

The electrical tube characteristics of Figure 13 showing the burning potential-current curve H with deionizing vapor added, such as for example 1% water vapor, to the inert gas in a diode glow tube is similar to the curve of Figure 3, without vapor, except that the vapor causes a higher minimum current breakoff point below which stable conduction cannot exist. In this unstable range the rate of deionization is apparently greater than the rate of ion production by electron bombardment.

If the steady state tube current is set in the stable range just above the breakoff point by choosing the current limiting resistor R of proper value, then a small trigger pulse, for example, 20 volts in magnitude with rise times of 1 microsecond or less, momentarily reducing the current below breakoff will quench the discharge. The tube will refire when the potential across it has risen to the firing point. The heavier vapor molecules cause rapid quenching of the discharge when the voltage gradient is momentarily lowered by the input pulse. The dissociated quenching gas or vapor automatically combines, giving the tube a reasonably long life. Sensitivity to triggering can thus be obtained at relatively high tube currents. The unstable current region below breakoff can be extended and triggering sensitivity can be increased still further by suitable capacitance loading across the tube. Consequently, much higher pulse repetition rates can be handled. With tubes of the present construction, upper limits of the pulse repetition rate is of the order of 100 kc. per second, and minimum time delay of approximately 5 microseconds.

While in order to comply with the statute, the invention has been described in language more or less specific as to structural features, it is to be understood that the invention is not limited to the specific features shown, but that the means and construction herein disclosed comprise the preferred form of several modes of putting the invention into effect and the invention is, therefore, claimed in any of its forms or modifications within the legitimate and valid scope of the appended claims.

What is claimed is:

1. A diode pulse amplifier comprising a gas-filled glow tube at glow discharge pressure and containing two symmetrical cold electrodes, one of said electrodes to act as an anode and the other as a cathode, a high D. C. voltage supply for said glow tube, a current limiting resistance connecting said anode to one terminal of said supply, said cathode connecting with the other terminal of said supply to maintain said glow tube in a normally conducting condition, a pulse source, coupling means connecting said pulse source across said electrodes, said pulse source being of a predetermined polarity to provide quenching pulses tending to decrease the conducting potential of said glow tube and place it momentarily in a non-conducting condition; and an output circuit connected across said electrodes and comprising a series combination of a capacitive energy storage means, a crystal diode, and a low resistance load, said capacitive energy storage means and said crystal diode reducing the shunting effect of said low resistance load.

2. A diode pulse amplifier comprising a gas-filled glow tube at glow discharge pressure and containing two symmetrical cold electrodes, one of said electrodes to act as an anode and the other as a cathode, a high D. C. voltage supply for said glow tube, a current limiting resistance connecting said anode to one terminal of said supply, said cathode connecting with the other terminal of said supply to maintain said glow tube in a normally conducting condition, a pulse source, coupling means connecting said pulse source across said electrodes, said pulse source being of a predetermined polarity to provide quenching pulses tending to decrease the conducting potential of said glow tube and place it momentarily in a non-conducting condition; and an output circuit connected across said electrodes and comprising a series combination of a capacitive energy storage means, a first and a second crystal diode disposed in opposing orientation, and a reactive load, with a parallel combination of a dissipative resistance and capacitance connected across the series combination of said second crystal diode and said reactive load, to attenuate reflected pulses from said reactive load.

3. A diode pulse inverter comprising a gas-filled glow tube at glow discharge pressure and containing a first and a second cold electrode, a high D. C. voltage supply for said glow tube, a current limiting resistance connecting one terminal of said voltage supply to said first electrode, a low internal impedance pulse source, said source being of a predetermined polarity to provide input quenching pulses to said glow tube, a series combination of an oscillation damping crystal diode and energy storage capacitance connecting said pulse source between said first electrode and the other terminal of said voltage supply, and a load connected between said second electrode and said other supply terminal.

4. A diode pulse inverter comprising a gas-filled glow tube at glow discharge pressure and containing a first and a second cold electrode, a high D. C. voltage supply, a current limiting resistance connecting one terminal of said voltage supply to said first electrode, a high internal resistance pulse source, said pulse source being of a predetermined polarity to provide input quenching pulses to said glow tube, a series coupling and energy storage capacitance connecting said pulse source between said first electrode and the other terminal of said voltage supply, a shunting crystal diode connected across said pulse source, and a load connected between said second electrode and said other supply terminal.

5. A diode pulse inverter comprising a gas-filled glow tube at glow discharge pressure and containing a first and a second cold electrode, a high D. C. voltage supply, a resistance connecting one terminal of said voltage supply to said first electrode, a high internal resistance pulse source, said pulse source being of a predetermined polarity to provide input quenching pulses to said glow tube, a series coupling capacitance connecting said pulse source between said first electrode and the other terminal of said voltage supply, a load connected between said second electrode and said other supply terminal, and a series combination of a second capacitance and a crystal diode connected across the series combination of said glow tube and load.

6. A diode pulse inverter comprising a gas-filled glow tube at glow discharge pressure and containing a first and a second cold electrode, a high D. C. voltage supply, a first resistance connecting one terminal of said supply to said first electrode, a high internal resistance pulse source, said pulse source being of a predetermined polarity to provide input quenching pulses to said glow tube, a series coupling capacitance connecting said pulse source between said first electrode and the other terminal of said supply, a high impedance load connected between said second electrode and said other supply terminal, and a second resistance connected across said load to reduce effective output load impedance.

References Cited in the file of this patent

UNITED STATES PATENTS

| | | |
|---|---|---|
| 1,680,377 | Holden | Aug. 14, 1928 |
| 2,021,034 | Thompson | Nov. 12, 1935 |
| 2,088,495 | Swedlund | July 27, 1937 |
| 2,235,667 | Blount et al. | Mar. 18, 1941 |
| 2,457,125 | Chatterjea | Dec. 28, 1948 |
| 2,495,768 | Reeves | Jan. 31, 1950 |